Oct. 11, 1932.  G. K. LEWIS  1,881,734
CORNER BEND IN COMPOSITE PANELS AND METHOD OF FORMING SAME
Filed Aug. 16, 1930

Witness
William P. Kilroy

Inventor:
George K. Lewis
By George I. Haight
Atty.

Patented Oct. 11, 1932

1,881,734

UNITED STATES PATENT OFFICE

GEORGE K. LEWIS, OF CHICAGO, ILLINOIS, ASSIGNOR TO MET-L-WOOD CORPORATION, OF CHICAGO, ILLINOIS, A CORPORATION OF ILLINOIS

CORNER BEND IN COMPOSITE PANELS AND METHOD OF FORMING SAME

Application filed August 16, 1930. Serial No. 475,743.

My invention relates to improvements in the formation of bends or corners in composite laminated panels.

The object of my invention is to provide a corner formation and method of making same, in composite laminated structures or panels of the type wherein a fibrous core or body is sheathed on both sides with a lamination of sheet metal.

Other objects of my invention will appear hereinafter.

A composite panel structure of the character for which my invention is particularly applicable, is shown in the accompanying drawing on a greatly enlarged scale for the purpose of clearly illustrating the invention.

Referring to the drawing, Fig. 1 is a section of a portion of a flat composite panel structure.

Figure 1:
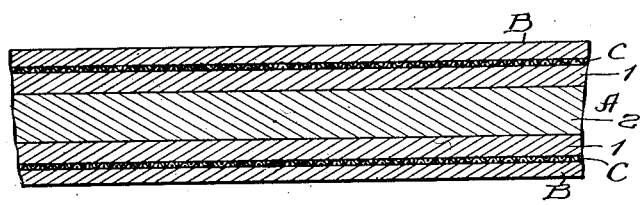

In the drawing, the panel structure is shown on a greatly enlarged scale to better illustrate the character of the invention. Composite panels of this type, however, are seldom over ¼ to 5/16 inch thick. The panel structures comprise a body or core portion A of fibrous material, such as wood, and both sides of the body are sheathed with sheet metal layers or veneers B. A layer of bonding material C is generally interposed between the outer metal sheets and the body, and is composed of canton flannel or other suitable fabric which will permit expansion and contraction of the panel without separation of the laminations. The body A is made up of a plurality of layers of wood 1 and 2. In the present structure, the body is shown as being composed of three layers— two outer ones 1, which are thinner than the intermediate layer 2. It is the practice to dispose these layers with the grain or fibre of the wood arranged in different directions. For instance, the two outer layers will have the grain running in the same direction, while the intermediate layer 2 will have its grain disposed at right angles.

The several laminations or layers, including the bonding fabric and the metal sheathing layers B, are all assembled together with glue therebetween and compressed into intimate compact relation.

Panel structures of this character are manufactured as flat sheets or boards, and by reason of their laminated construction are exceptionally strong. Fabricating structures of these composite panels often require the formation of angles or corners in which portions of the panel are disposed at an angle to other portions thereof. It is the purpose of this invention to form the structure in such manner that the panels can be bent or folded sharply and the parts then united in such manner as to form a corner construction as strong as the remaining portions of the panels.

Figure 2:
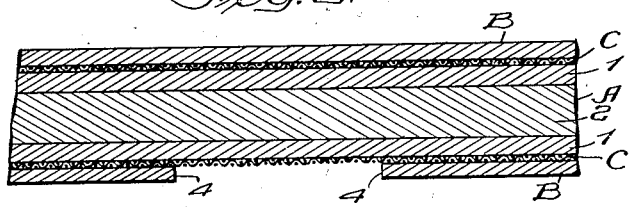
Fig. 2 is a similar section showing a portion of one of the outer metal sheathings or layers removed in preparation for the formation of a corner bend.
Figure 3:
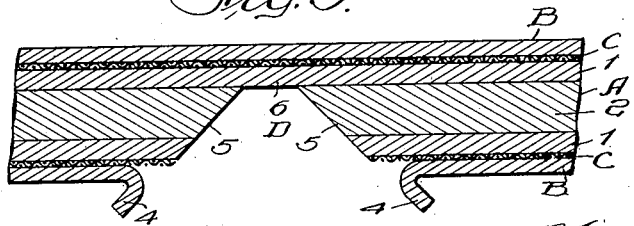
Fig. 3 is a similar section showing a portion of the body of the panel removed, the edges of the sheathing being turned outwardly.
Figure 4:
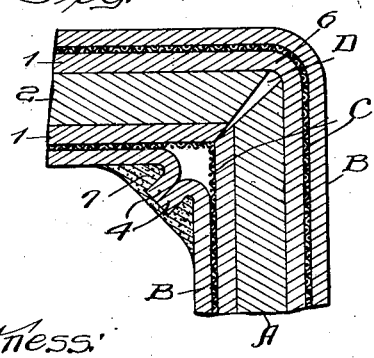
Fig. 4 is a similar section of the bent panel showing the corner formation completed.

In Fig. 1 the panel is shown in a flat plane ready to be prepared for bending. In Fig. 2 one of the exterior metal sheets forming the outer layer is cut along parallel lines and a portion thereof removed, the width of this removed portion corresponding to the requirements of the angle to which the panel is to be bent. After this width is removed, the edges 4 of the remaining sections of the metal sheet are turned or bent outwardly in a direction away from the face of the panel, as indicated in Fig. 3. When the panel is folded or bent, these outwardly turned edge portions are intended to meet in the inside of the corner thus formed, as shown in Fig. 4. The angle to which the edge portions 4 are turned or bent outwardly is determined by the degree of the angle into which the portions of the panel are bent, for the reason that it is preferable, as shown in Fig. 4, to have the edges meet in substantially parallel relation whereby an effective joint can be made.

After the edges 4 have been turned outwardly, a groove or channel D is cut in the body portion A, this groove being located substantially between the turned edges 4 and extending in a direction parallel with said edges. This groove has walls 5 which, as shown in Fig. 3, diverge outwardly toward the edges 4. In cutting out the channel D, it is intended to remove the excess portion of the body material which would otherwise buckle and interfere with the bending of the panel. Hence, the width of the channel is preferably governed by the angle of the formed corner.

It is preferable not to cut the channel D throughout the entire thickness of the body A, but rather to such depth as to reach within one lamination of the opposite outer sheathing B. Thus when the panel is bent, the stock in this portion 6 of the uncut body lamination forms a backing for the outer metal sheet B at the bend, and a much neater and smoother bend can be made. In bending the panel the portion 6, as indicated in Figs. 4 and 5, of the body lamination is compressed tightly into the inside of the bend in the outer metal sheet, thus serving to rigidify the corner edge of the metal sheet and render it less subject to dents or distortions due to blows.

The bending operation of the panel is, of course, accomplished by means of suitable bending machinery adapted for this purpose. When the panel is bent, the channel or groove D is practically closed up, as shown in Figs. 4 and 5, and the turned edges 4 of the inner metal sheet are brought together into actual contact or into closely meeting relation. These turned edges 4 then form an anchor by which the two sections of the inner metal sheet can be fastened together. In Fig. 4, these edges are shown as united by flowing a body of solder 7 into the corner in such manner as to embed the edges 4 and to provide a filet in the corner of the structure to finish off the corner. This, in effect, renders the two sections of the metal sheet again continuous and practically integral and makes the inner sections of the sheet metal as rigid and strong as originally. In addition to this, the solder seals the joint between the edges in a manner to render the joint entirely waterproof.

Figure 5:
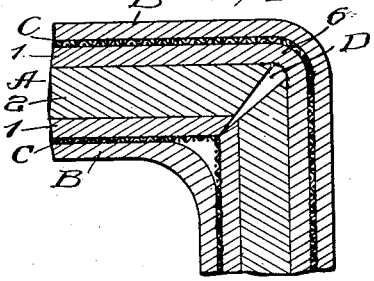
Fig. 5 is a similar section of a modification of the structure shown in Fig. 4.

In Fig. 5, the edges 4 are united by welding in any well-known manner. The effect of welding is to fuse the edges together and thus unite the two sections of the metal sheet into an integral continuous structure throughout the corner. During the welding operation the metal in the edges 4 can be made to flow into the corner in a manner to form a filet and finish off the corner.

While I have illustrated one embodiment of my invention in the drawing, it is understood that changes may be made in the construction and arrangement of the parts without departing from the spirit of the invention, and I contemplate such changes as fall within the scope of the appended claims.

I claim:

1. The method of forming bends in composite laminated panels having metal sheathing on both sides, consisting in cutting away a portion of one of the metal sheathings and the contiguous core portions, turning outwardly the edges of said sheathing formed by the cutaway portion, bending the panel on the opposite metal sheathing until the turned edges are brought together, and joining said turned edges.

2. The method of forming bends in composite laminated panels having superposed laminations of wood forming a core and a veneer of sheet metal on both sides of said core, which consists in cutting away a portion of the sheet metal on one side and partially cutting away a portion of the thickness of the core, turning outwardly at an angle the cut edges of said metal sheet, bending the panel along a line through the remaining thickness of core and the opposite metal sheet to bring the said turned edges into juxtaposition with respect to each other, and joining said turned edges.

3. The method of forming angular bends in composite panels having a fibrous body portion and sheet metal veneers on both sides, consisting in removing a portion of the metal sheet on one side of the panel and bending outwardly the edges of said metal sheet formed by removing said portion, cutting a groove in the body between said bent edges, folding the panel along said groove to bring the bent edges into close relation to each other and binding said bent edges.

4. The method of forming angular bends in composite panels having a fibrous body portion and sheet metal veneers on both sides, consisting in removing a portion of the metal sheet on one side of the panel and bending outwardly the edges of said metal sheet formed by removing said portion, cutting a groove in the body between said bent edges, folding the panel along said groove to bring the bent edges into close relation to each other and flowing metal into the corner formed at said bent edges to bind the said edges together.

5. In a structure of the class described, comprising a composite laminated panel having a metal sheet on one side bent angularly to form a corner and having a metal sheet on its opposite side disposed at an angle with edge portions turned outwardly and secured together in the corner, and an intermediate body portion between the metal sheets composed of fibrous material and having a groove cut substantially through its thickness and disposed on a line from the bend in the outer sheet to the united edges at the inner corner.

6. The method of forming bends in composite laminated structures comprising a body of laminations of fibrous material and superposed sheet metal laminations on each side of said body, consisting in cutting a width of one sheet metal lamination and turning the remaining edge portions outwardly at an angle, cutting a groove in the body between said turned edges with the walls of the groove diverging toward said turned edges, bending the body and sheet metal laminations on the opposite side to bring the turned edges and divergent walls into meeting relation, and uniting the turned edges with each other.

7. A corner construction for composite panels comprising a fibrous body having wall portions disposed at an angle to each other, an outer continuous metal sheet lamination bent to the angle of said body portions, and an inner metal sheet lamination comprising two sections disposed at the same angle with their edge portions bent outwardly and extending into said angle, and means securing said edge portions.

8. A corner construction for composite panels comprising a fibrous body having wall portions disposed at an angle to each other, an outer continuous metal sheet lamination bent to the angle of said body portions, an inner metal sheet lamination comprising two sections disposed at the same angle with their edge portions bent outwardly and extending into said angle, and solder flowed into the angle and embedding said outwardly bent edge portions to secure said edge portions.

In witness that I claim the foregoing I have hereunto subscribed my name this 13th day of August, 1930.

GEORGE K. LEWIS.